United States Patent [19]

Shikichi

[11] Patent Number: 5,436,438

[45] Date of Patent: Jul. 25, 1995

[54] OPTICAL INFORMATION RECORDING AND/OR REPRODUCING METHOD AND APPARATUS USING CARD-LIKE OPTICAL INFORMATION RECORDING MEDIUM

[75] Inventor: Satoshi Shikichi, Tokyo, Japan

[73] Assignee: Canon Kabushiki Kaisha, Tokyo, Japan

[21] Appl. No.: 35,313

[22] Filed: Mar. 22, 1993

[30] Foreign Application Priority Data

Mar. 31, 1992 [JP] Japan ................................ 4-077412

[51] Int. Cl.$^6$ .............................................. G06K 7/04
[52] U.S. Cl. .................... 235/454; 369/44.28
[58] Field of Search ............... 369/44.28, 43, 47, 48, 369/30; 235/454

[56] References Cited

U.S. PATENT DOCUMENTS 4,982,391  1/1991  Sakagami et al. ................. 369/47

FOREIGN PATENT DOCUMENTS 0257595  3/1988  European Pat. Off. .
0279696  8/1988  European Pat. Off. .

*Primary Examiner*—Paul M. Dzierzynski
*Assistant Examiner*—Don Wong
*Attorney, Agent, or Firm*—Fitzpatrick, Cella, Harper & Scinto

[57] ABSTRACT

A card-like optical information recording medium is used to effect recording and/or reproducing of information thereon. Relative movement between the recording medium and an optical head for irradiating the medium with light beam is conducted to record or reproduce information on or from the recording medium. A relative velocity between the optical head and the recording medium caused by the relative movement is detected to check if the velocity is being changed. When it is detected that the relative velocity is being changed as an acceleration or deceleration therebetween, a light spot formed by the optical head on the recording medium is shifted from the current track to another track such as a neighboring or desired track.

4 Claims, 9 Drawing Sheets

OPTICAL INFORMATION RECORDING AND/OR REPRODUCING METHOD AND APPARATUS USING CARD-LIKE OPTICAL INFORMATION RECORDING MEDIUM

BACKGROUND OF THE INVENTION

Field of the Invention

The present invention relates to an optical information recording and/or reproducing method and apparatus and, more particularly, to an optical information recording and/or reproducing method and apparatus with improved kick operation characteristics of a light beam spot onto a target information track. The present invention is suitably applied to, e.g., an optical information recording and/or reproducing method and apparatus which use an optical card as an optical information recording medium.

Related Background Art

Conventionally, as different media on or from which information is recorded or read out using light, various media such as a disk-like medium, a card-like medium, a tape-like medium, and the like are known. These optical information recording media include ones allowing both recording and reproduction, ones allowing reproduction alone, and the like.

Information is recorded on a recordable medium by scanning an information track using a light beam modulated according to recording information and converged to a minute beam spot, and the information is recorded as an information bit train which can be optically detected.

Information is reproduced from a recording medium by scanning the information bit train on the information track using a light beam spot having a predetermined power, which is low enough not to perform recording on the medium, and by detecting light reflected by or transmitted through the medium.

In order to irradiate a recording medium with a light beam spot or to detect light reflected by or transmitted through the medium, a so-called optical head is used. The optical head is movable relative to the recording medium in the information track direction, and in a direction perpendicular to the information track direction. Upon this relative movement, the light beam spot can trace a desired information track.

Of the above-mentioned optical information recording media, a card-like optical information recording medium (to be referred to as an optical card hereinafter) is expected to be in great demand as a relatively large-capacity information recording medium, which is compact and lightweight, and is easy to carry.

The optical card has several thousands to several ten thousands of parallel information tracks. Thus, in order to record/reproduce information on/from a desired information track, the desired information track must be accurately selected from a large number of tracks. In general, such a track selection operation is called a track access or simply an access, and the access includes an operation for moving the entire optical head in a direction perpendicular to the information track, and an operation for moving only a portion of an optical system in the optical head, e.g., an objective lens, in the direction perpendicular to the information track while fixing the entire optical head in position. The latter operation is called a kick operation.

An optical information recording and/or reproducing apparatus for recording and/or reproducing information using a recording medium of this type normally has an auto-focusing (AF) control means for performing control for constantly forming a light beam spot having a predetermined size on the surface of a recording medium while following a surface deviation of the recording medium. Also, the optical information recording and/or reproducing apparatus generally has an auto-tracking (AT) control means for accurately positioning a light beam spot on an information track while following a deviation of the information track due to an information track arrangement error with respect to an external shape of the recording medium. When the information recording medium is an optical card, the "information track arrangement error with respect to the external shape of the recording medium" is a skew of each information track with respect to a side of the optical card.

The kick operation is normally performed as follows. More specifically, an AT control loop is opened, and a pulse (kick pulse) is applied to an actuator for moving the objective lens in the direction perpendicular to the information track, thereby moving the objective lens in the direction perpendicular to the information track. After an elapse of an appropriate period of time, a pulse (brake pulse) having a polarity opposite to that of the kick pulse is applied to the actuator to brake the movement of the objective lens, so that the velocity of a light beam spot becomes zero when the spot is just located on a neighboring information track. Such operations are attained by properly setting the magnitudes and widths of the kick and brake pulses. At this time, the AT control loop is closed, and the light beam spot is guided into a target information track.

Normally, the information recording and/or reproducing apparatus for an optical card performs recording and/or reproducing of information while reciprocally moving the optical card and the optical head relative to each other. At this time, the relative movement is performed at a constant velocity on an information area of each information track, and is accelerated/decelerated at the end portion of each information track to attain a reverse operation.

However, in the conventional apparatus, the kick operation is performed when the relative velocity between the optical head and the optical card is constant. For this reason, the optical card must have an area for the kick operation, and the ratio of data recording area is decreased, thus disturbing an effective use of the medium area.

In another conventional apparatus, the kick operation is performed after the relative moving velocity between the optical card and the light beam spot becomes substantially zero. With this method, a kick operation time is independently required, and consequently, the recording and/or reproducing time is prolonged.

SUMMARY OF THE INVENTION

The present invention has been made in consideration of the conventional problems, and has as its object to provide an optical information recording and/or reproducing method and apparatus, which do not disturb an effective use of a medium area, and can prevent the recording and/or reproducing time from being prolonged by the kick operation.

In order to achieve the above object, there is provided an optical information recording and/or reproducing method for recording and/or reproducing information by reciprocally moving a card-like optical information recording medium having a plurality of parallel information tracks and an optical head relative to each other in an information track direction, and irradiating the medium with a light spot from the optical head, having:

a step of moving the light spot from the current track to a neighboring track or a required track, wherein the moving step is executed when a relative velocity between the optical head and the recording medium in the information track direction is being changed.

There is also provided an optical information recording and/or reproducing apparatus for recording and/or reproducing information by reciprocally moving a card-like optical information recording medium having a plurality of parallel information tracks and an optical head relative to each other in an information track direction, and irradiating the medium with a light beam from the optical head, comprising:

an optical head;

relative movement means for moving the optical head and the medium relative to each other along the information track; and light spot moving means for moving the light spot from the current track to a neighboring track or a desired track, wherein the light spot moving means moves the light spot from the current track to a neighboring track or a desired track when a relative velocity between the optical head and the recording medium in the information track direction is being changed during the relative movement by the relative movement means.

DETAILED DESCRIPTION OF THE PREFERRED EMBODIMENTS

The preferred embodiments of the present invention will be described hereinafter with reference to the accompanying drawings.

Figure 1:
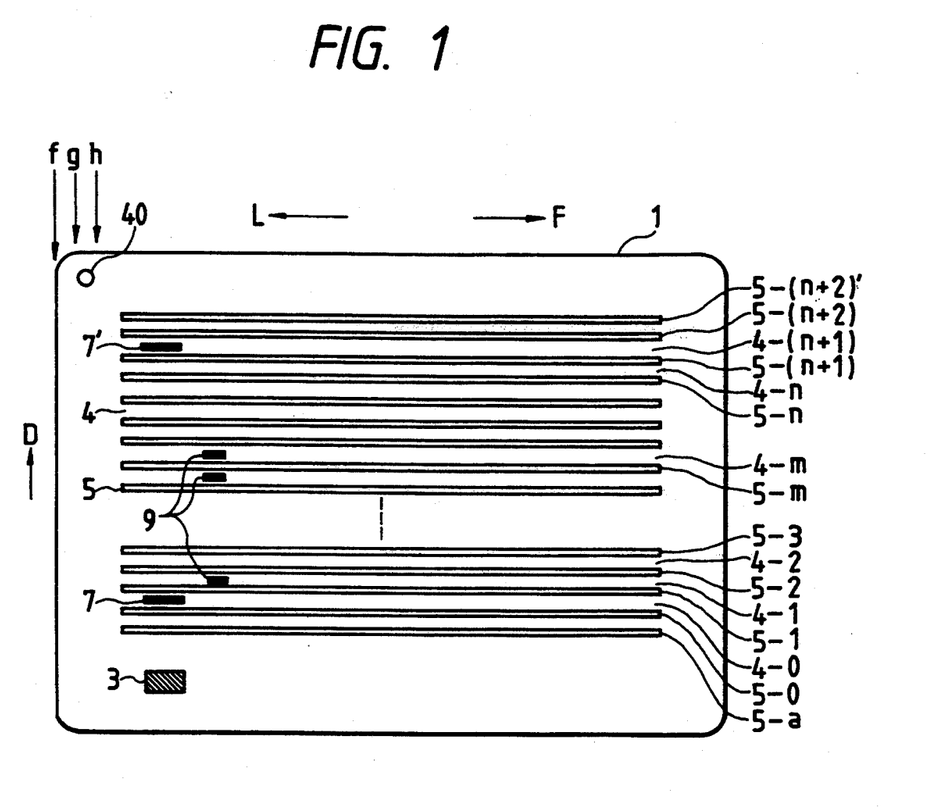
FIG. 1 is a plan view showing an optical information recording medium (optical card) used in an information recording and/or reproducing method and apparatus according to the present invention.

FIG. 1 is a plan view showing an optical card used in an optical information recording and/or reproducing apparatus according to the present invention.

Referring to FIG. 1, a large number of parallel information tracks 4 extending in a direction indicated by arrows L and F (hereafter referred to as the LF direction) are aligned on the information recording surface of an optical card 1, and a home position 3 serving as a reference position of an access to the information tracks 4 is also arranged. The information tracks 4 are aligned from a position near the home position 3 in the order of 4-0, 4-1, 4-2, 4-3,..., 4-(n+1). Tracking tracks 5-0, 5-1, 5-2, 5-3, . . . , 5-(n+1) are arranged in correspondence with these information tracks. Note that a tracking track 5-a as a guard track is arranged adjacent to the tracking track 5-0 at a side opposite to the tracking track 5-1, and similarly, tracking tracks 5-(n+2) and 5-(n+2)' as guard tracks are arranged adjacent to the tracking track 5-(n+1) at a side opposite to the tracking track 5-n. A proper number of these guard tracks can be arranged.

Figure 2:
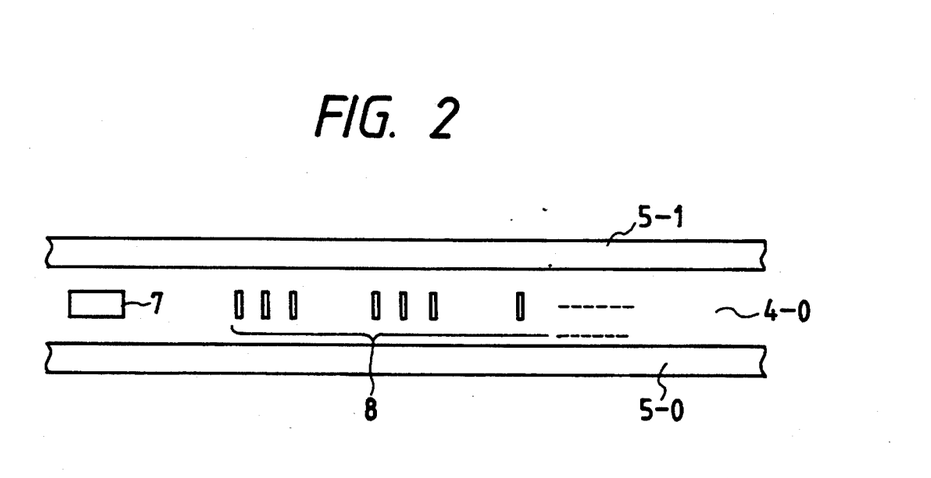
FIG. 2 is a partial enlarged view of the optical card shown in FIG. 1.

FIG. 2 is a partial enlarged view of the optical card shown in FIG. 1.

As shown in FIG. 2, a G mark 7 is pre-recorded on the information track 4-0. The G mark indicates that the corresponding information track is a reference track, and hence, the information track 4-0 is the reference track. On the reference track, a recording medium identification pattern 8 is recorded. The recording medium identification pattern indicates the type of optical card, and more specifically, information associated with the optical card, e.g., a modulation/demodulation method, a data capacity per information track, the total number of tracks, and the like. The G mark 7 or the recording medium identification pattern 8 is formed by pre-formatting the tracking tracks, or is formed by recording using a light beam spot.

In FIG. 1, of the information tracks 4-1 to 4-n, information has already been recorded on the information tracks 4-1 to 4-m, and these information tracks are information tracks in which information has already been recorded. No information is recorded on the information tracks 4-(m+1) to 4-n, and these information tracks are non-recorded information tracks. A no-error mark (V mark) 9 is formed on an extended line of the end portion, in an L direction, of recorded information on each recorded information track when the information recorded on the corresponding information tracks does not suffer from an error. After information is recorded on an information track, the recorded content is reproduced to check if the recorded content includes an error, and only when it is determined that the recorded content does not include any error, a no-error mark is recorded at a predetermined position using a light beam spot. In the case of FIG. 1, since no V mark corresponding to the information track 4-2 is formed, information recorded on the information track 4-2 includes an error. In 10 place of the V mark, an error mark may be formed when it is determined that the recorded content includes an error.

As shown in FIG. 1, a G mark 7' is also recorded on the information track 4-(n+1), and this information track also serves as a reference track. In this case, this reference track is a reference for directories, and directory information of each recorded information track is recorded on the information track 4-(n+1). Every time information is additionally recorded on a non-recorded information track, the directory information is also additionally recorded. When the reference track 4-(n+1) is filled with information, directory information is recorded on the information tracks 4-n, 4-(n−1), . . . in turn.

As shown in FIG. 1, a small hole 40 is formed on the upper left corner portion of the optical card 1.

Figure 3:
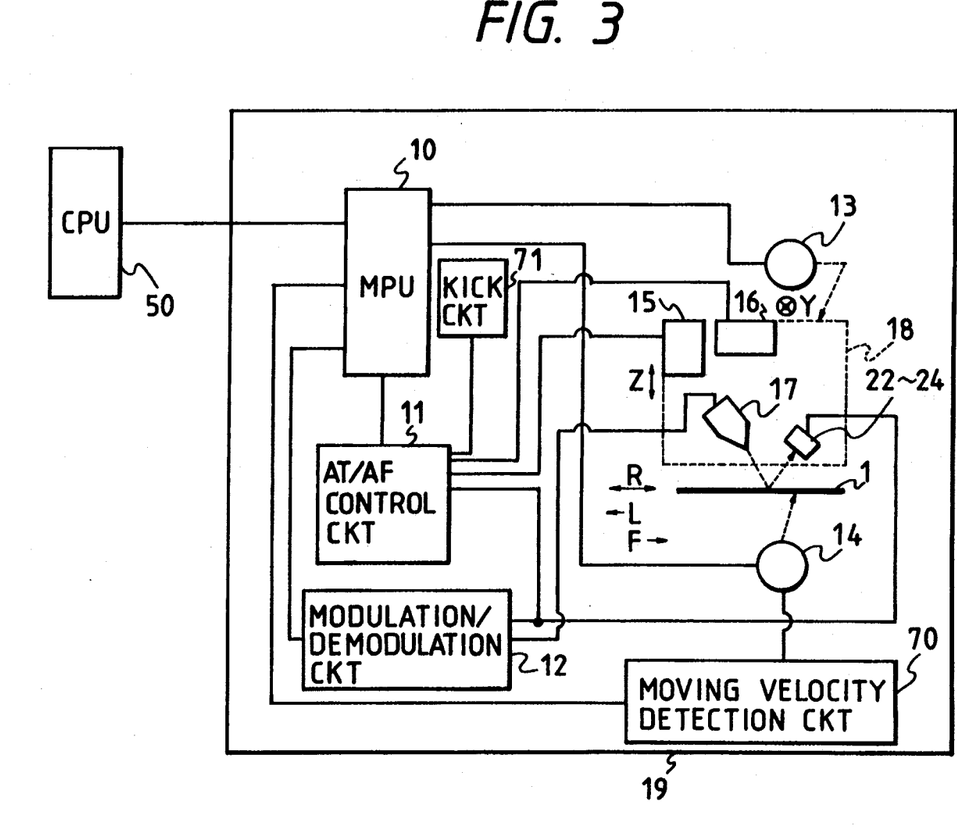
FIG. 3 is a schematic block diagram showing a construction of an information recording and/or reproducing apparatus according to an embodiment of the present invention.

FIG. 3 is a block diagram showing a schematic arrangement of an optical information recording and/or reproducing apparatus according to an embodiment of the present invention, which records information on the above-mentioned optical card 1, and reproduces information recorded on the optical card.

In FIG. 3, the overall apparatus is denoted by reference numeral 19, and is connected to a CPU 50 as a host control device. In the apparatus 19, a driving motor 14 is used for loading the optical card 1 into the apparatus via a conveying mechanism (not shown), reciprocally moving the card in an R direction (a direction parallel to the information tracks), and unloading the card outside the apparatus.

An optical head 18 includes a light beam irradiating optical system 17 including a light source. The optical system 17 forms a light beam spot on the optical card 1 in information recording and reproduction modes. In this embodiment, three light beam spots are formed on the optical card in the recording and/or reproducing mode. Photodetectors 22 to 24 can respectively receive reflected light components of the three light beam spots on the optical card 1. An auto-focusing (AF) actuator 15 is used for performing an AF operation by driving a portion of the light beam irradiating optical system 17 so as to move the focusing positions of the light beam spots in a Z direction, e.g., a direction perpendicular to the optical card surface. An auto-tracking (AT) actuator 16 is used for performing an AT operation by driving another portion of the light beam irradiating optical system 17 so as to move the light beam spots on the optical card surface in a Y direction (a direction perpendicular to both the R and Z directions).

The optical head 18 is constituted by the light beam irradiating optical system 17, the photodetectors 22 to 24, the AF actuator 15, and the AT actuator 16. A driving motor 13 is used for moving the optical head in the Y direction to access the light beam spots to a target track on the optical card.

The driving motors 13 and 14 are controlled by an MPU 10. The outputs from the photodetectors 22 to 24 are input to an AT/AF control circuit 11, and the control circuit controls the AF and AT actuators 15 and 16 on the basis of the input data so as to perform the AF and AT operations. The outputs from the photodetectors 22 to 24 are also input to a modulation/demodulation circuit 12 to demodulate read information, and a demodulated signal is supplied to the MPU 10. The modulation/demodulation circuit 12 modulates an information signal supplied from the MPU 10, and drives the light beam irradiating optical system 17 according to the modulated signal, thus recording information.

A moving velocity detection circuit 70 detects the relative moving velocity, in the R direction, between the optical card 1 and the optical head 18 from the driving motor 14. A kick circuit 71 issues instructions for opening/closing an AT control loop and for a kick operation to the AT/AF control circuit 11.

The MPU 10 is controlled by the CPU 50, and exchanges data with the CPU.

Figure 4:
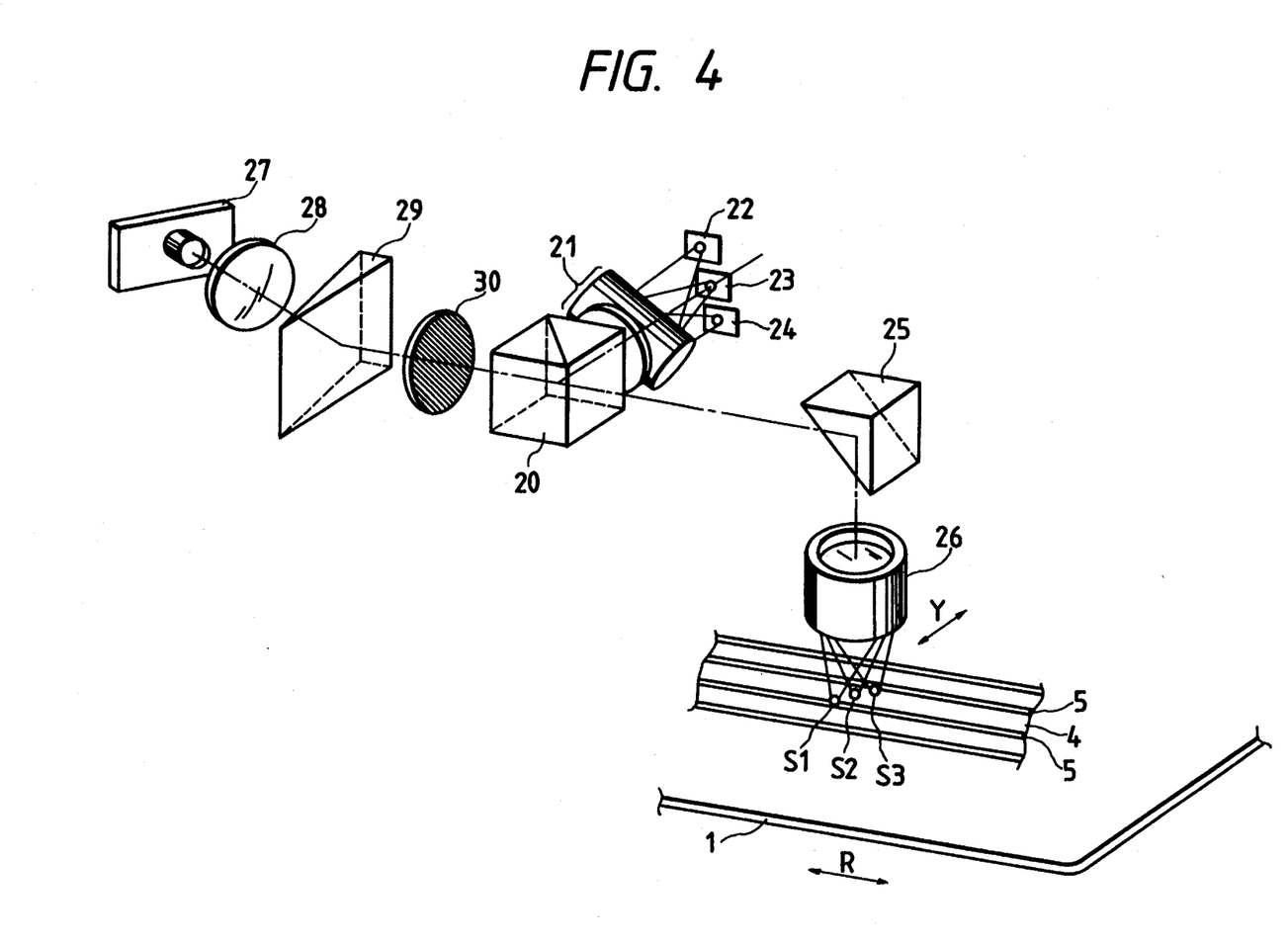
FIG. 4 is a perspective view showing the details of an optical head portion shown in FIG. 3.

FIG. 4 is a perspective view showing the details of the optical head portion shown in FIG. 3.

In FIG. 4, the optical head comprises a semiconductor laser 27 as a light source, a collimator lens 28, a light beam shaping prism 29, a diffraction grating 30 for splitting a light beam, a beam splitter 20, a reflection prism 25, an objective lens 26, an astigmatism focusing lens system 21, and the photodetectors 22 to 24.

Figure 5:
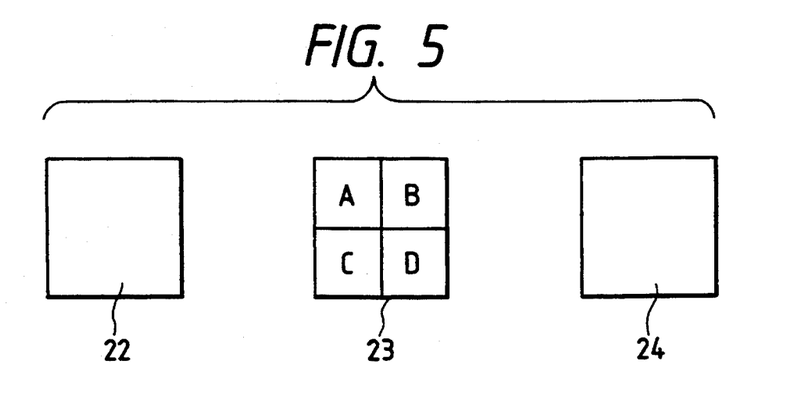
FIG. 5 is a view showing arrangements of photodetectors of the optical head shown in FIG. 4.

A light beam emitted from the semiconductor laser 27 is incident on the collimator lens 28 as a divergent light beam, and is collimated into a parallel light beam by the lens 28. The parallel light beam is shaped by the light beam shaping prism to have a predetermined light intensity distribution. The shaped light beam is then incident on the diffraction Grating 30, and is split into three effective light beams (a 0th-order diffracted light beam and ±1st-order diffracted light beams) by the diffraction Grating. These three light beams are incident on the beam splitter 20, and are transmitted straight through the beam splitter. The light beams are then reflected by the reflection prism 25, and are incident on the objective lens 26. When these light beams are transmitted through the objective lens, they are focused, and form three small light beam spots S1 (corresponding to +1st-order diffracted light), S2 (corresponding to 0th-order diffracted light), and S3 (corresponding to −1st-order diffracted 10 light) on the optical card 1. The light beam spots S1 and S3 are located on neighboring tracking tracks 5, and the light beam spot S2 is located on the information track 4 between these tracking tracks 5. Then, reflected light beams of the light beam spots formed on the optical card are converted into almost parallel beams via the objective lens 26, and are reflected by the reflection prism 25. The reflected light beams are further reflected by the beam splitter 20, are focused by the focusing lens system 21, and are then incident on the photodetectors 22, 23, and 24. FIG. 5 shows the arrangements of the photodetectors 22 to 24. The photodetector 23 is a four-divided photodetector.

Figure 6A:
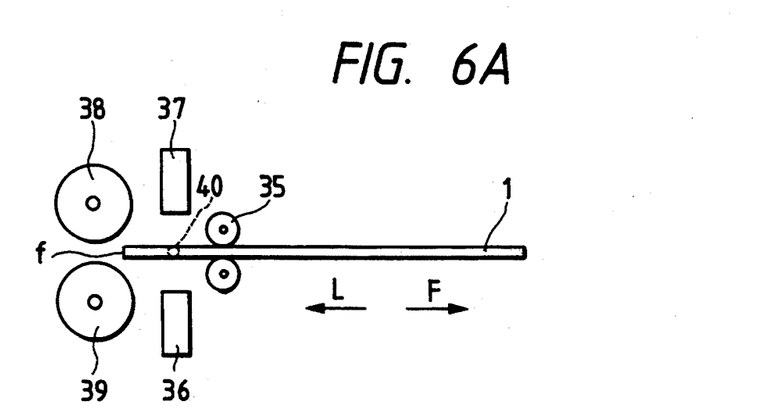
FIGS. 6A, 6B, and 6C are respectively a side view, a plan view, and a front view showing a main part of an optical card conveying mechanism shown in FIG. 3.
Figure 6B:
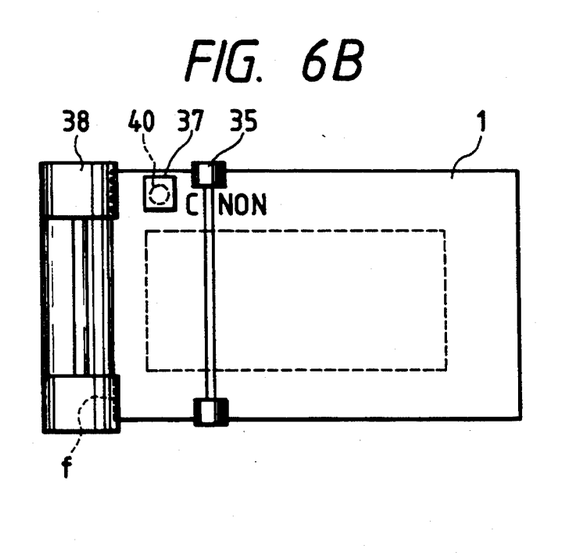
Figure 6C:
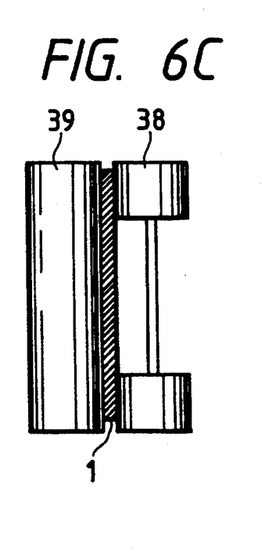

FIGS. 6A, 6B, and 6C are respectively a side view, a plan view, and a front view showing a main part of an optical card conveying mechanism in the optical information recording and/or reproducing apparatus.

In FIGS. 6A, 6B, and 6C, optical card introducing-/ejecting rollers 35 are driven based on the driving force generated by the driving motor 14 after it is detected by a photodetector (not shown) that the optical card 1 is inserted into the recording and/or reproducing apparatus, and move the optical card 1 in an L direction toward the recording and/or reproducing apparatus. In this case, the moving state of the optical card 1 is detected using a light-emitting element 37 and a light-receiving element 36. Rollers 38 and 39 are used for moving the optical card 1 loaded as described above to a recording and/or reproducing position, and furthermore, reciprocally moving the card 1 in the LF direction at the recording and/or reproducing position. Note that a proper number of rollers similar to these rollers are arranged along the LF direction. These rollers are driven based on the driving force generated by the driving motor 14 after it is detected by the light-emitting element 37 and the light-receiving element 36 that the optical card has reached the recording and/or reproducing position.

An embodiment of an information recording and/or reproducing method using the above-mentioned optical card and the optical information recording and/or reproducing apparatus will be described below.

First, the optical card 1 is introduced into the apparatus, and the rollers 35 (FIG. 6A) are driven to move the optical card 1 in the L direction.

Figure 7:
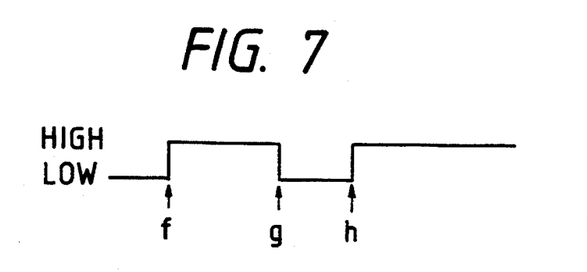
FIG. 7 is a chart showing a signal output from a light-receiving element.

FIG. 7 shows a signal output from the light-receiving element 36 upon introducing of the optical card 1. When a position f (i.e., the leading edge portion of the optical card) shown in FIG. 1 reaches the position of the light-receiving element, a LOW-level signal goes to HIGH level, and when a portion from a position g to a position h in FIG. 1 (i.e., a portion of the small hole 40) is located at the position of the light-receiving element, the signal goes to LOW level again. Whether or not the optical card 1 is introduced in a normal posture can be determined by checking if the signal having such a pattern is obtained and if the distance between the positions f and g calculated from the signal is a predetermined distance. When the above-mentioned signal cannot be obtained, and it is determined that the optical card introducing posture is not correct, the rollers 35 are immediately reversed to eject the optical card 1 from the recording and/or reproducing apparatus, and an alarm indicating this is output to an operator using a lamp, buzzer, or the like so as to urge the operator to re-introduce the optical card in a correct posture.

When it is determined that the optical card 1 is introduced in a correct posture, the optical card movement in the L direction is continuously performed by the rollers 35 and the rollers 38 and 39, and is stopped after an elapse of a predetermined period of time from the detection of the small hole 40. When the optical card is stopped, the light beam spots are just located at the home position 3.

Figure 8:
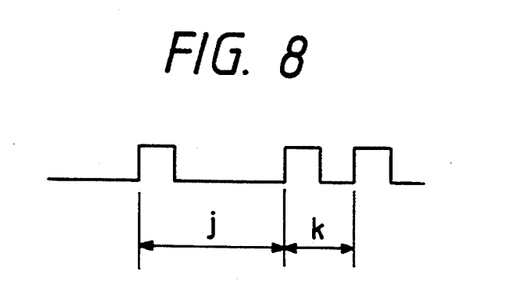
FIG. 8 is a chart showing a signal obtained from the photodetector.

In order to access the light beam spots to the reference track 4-0, the optical head 18 is moved by the driving motor 13 in the D direction in FIG. 1. Upon this movement, a signal shown in FIG. 8 is obtained from the photodetector 23 corresponding to the light beam spot S2. As shown in FIG. 1, since the G mark 7 is arranged at a position corresponding to the home position 3, an interval J appears until the tracking track 5-0 is detected. Upon detection of the G mark 7, a relatively short interval k appears. Thus, when the interval k appears, the movement of the optical head 18 is stopped.

The conveying mechanism is driven by the driving motor 14 to temporarily move the optical card 1 in the F direction in FIG. 1, so that reflected light from the light beam spot S2 is received by the photodetector 23 to detect the V mark. Thereafter, the optical card 1 is moved in the L direction to reproduce recorded information. The recording medium identification pattern 8 is read by this reproduction operation, and it is checked if the read pattern 8 indicates an optical card recorded in an internal ROM of the MPU 10, and compatible to this apparatus. The checking result is supplied to the CPU 50.

The light beam spots are returned to the home position 3, and the optical head 18 is moved by the driving motor 13 in the D direction to temporarily move the light beam spots to positions outside the tracking track 5-(n+2)'. Then, the light beam spot S2 is moved in a direction opposite to the D direction to access the reference track 4-(n+1) like in the access to the reference track 4-0. Similarly, directory information as recorded information of this information track is read out, and is recorded in an internal RAM of the MPU 10. Thereafter, the light beam spots are returned to the home position 3.

When information is recorded, the CPU 50 supplies a recording instruction signal to the MPU 10 of the apparatus 19, and the MPU determines a logical track number corresponding to the first information track 4-(m+1) of the non-recorded information tracks on the basis of the input recording instruction signal. The logical track numbers are serially added to the recorded information tracks in the order from the reference track 4-0, except for error tracks (i.e., information tracks without V marks 9).

In the recording and/or reproducing apparatus, after the track number is instructed, the optical head 18 is immediately moved by the driving motor 13 in the D direction in a state wherein the optical card 1 stands still so as to move the light beam spots in the D direction on the optical card 1, thus accessing a target information track.

Figure 9:
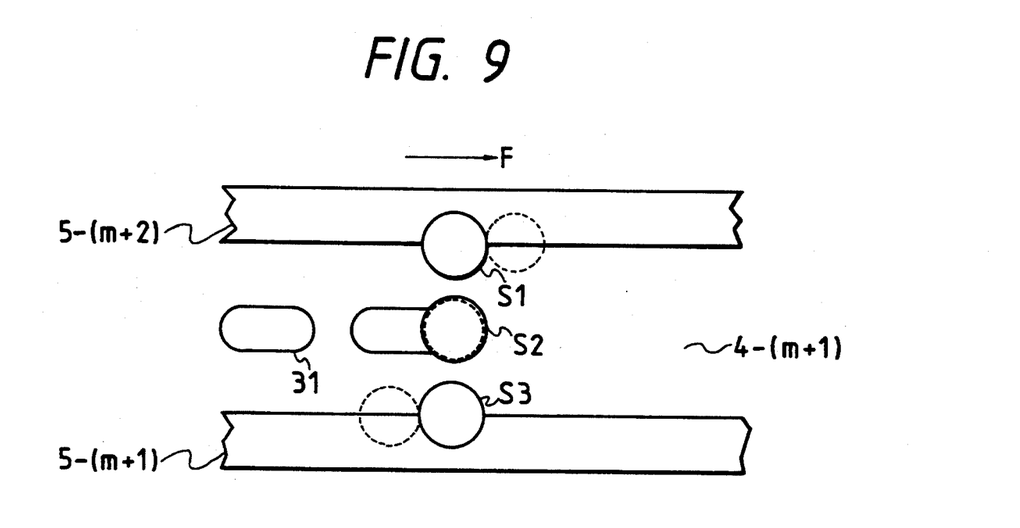
FIG. 9 is a view showing the relationship between the light beam spots and the tracks in a recording mode.

Upon completion of the access to the target information track, information is recorded on the target information track. FIG. 9 shows the relationship between the light beam spots and the tracks in the recording mode. The light beam spots S1 and S3 are respectively located on the tracking tracks 5-(m+1) and 5-(m+2), and reflected light beams of these light beam spots are respectively detected by the photodetectors 22 and 24. Then, the AT actuator 16 is driven to perform the AT operation, so that the light-receiving amounts of the photodetectors 22 and 24 become equal to each other. The light beam spot S2 is located on the information track 4-(m+1), and information bits 31 are recorded by modulated light upon movement of the optical card. A reflected light beam from the light beam spot S2 is detected by the four-divided photodetector 23, and the AF actuator 15 is driven to perform the AF operation, so that the light-receiving amounts of the divided portions become equal to each other.

In FIG. 9, the three light beam spots are arranged in a direction perpendicular to the information track, but may be obliquely arranged, as indicated by broken circles in FIG. 9.

Figure 10:
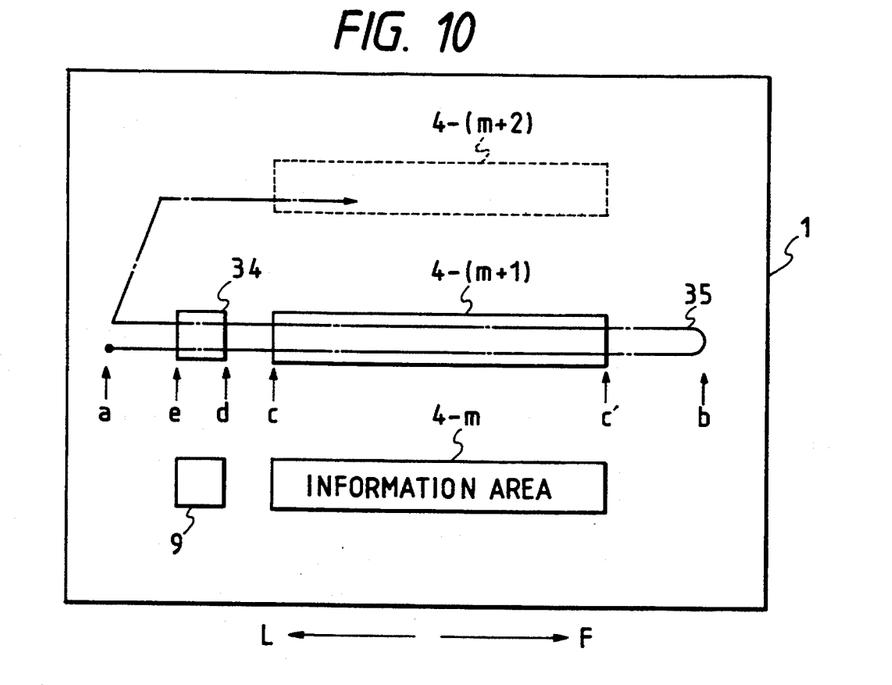
FIG. 10 is a view for explaining an information recording operation.

FIG. 10 is a view for explaining the information recording operation in more detail.

Figure 11A:
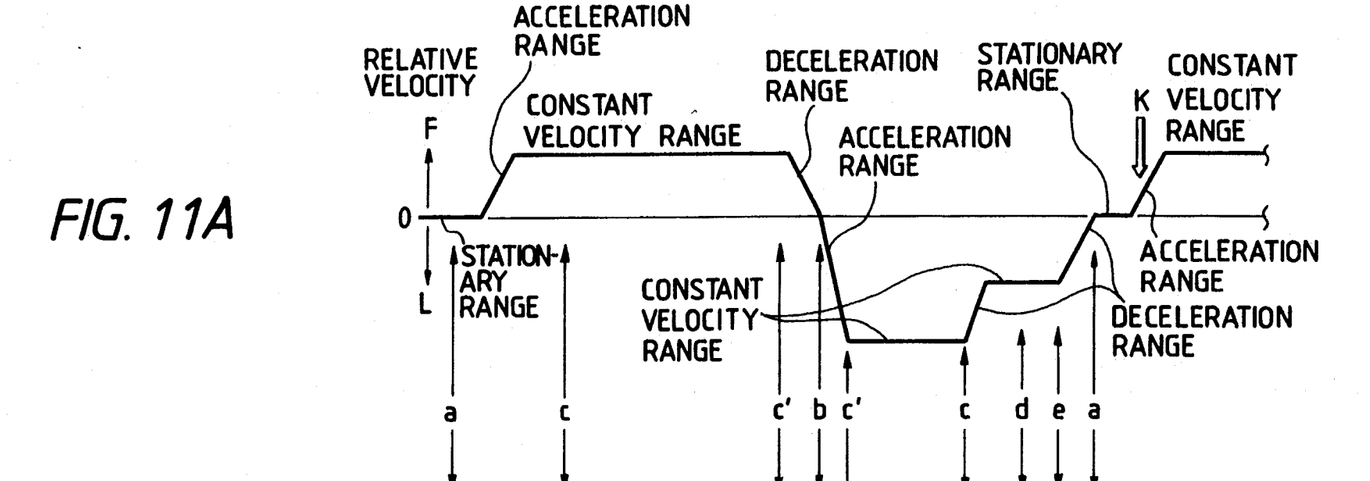
FIG. 11A is a chart showing a change in moving velocity of a light beam spot.
Figure 11B:
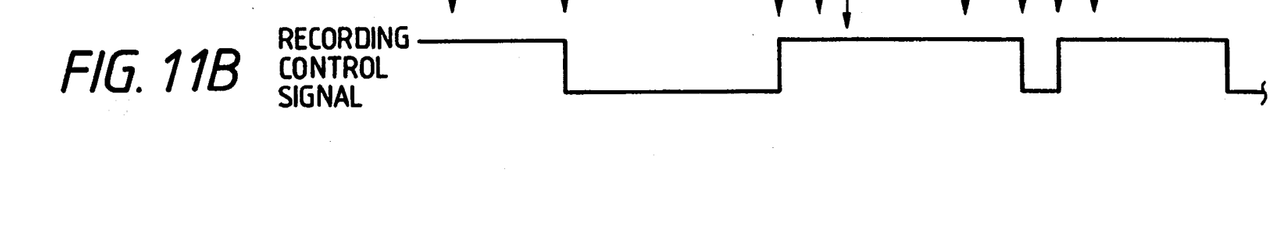
FIG. 11B is a chart showing a recording timing upon movement.
Figure 12:
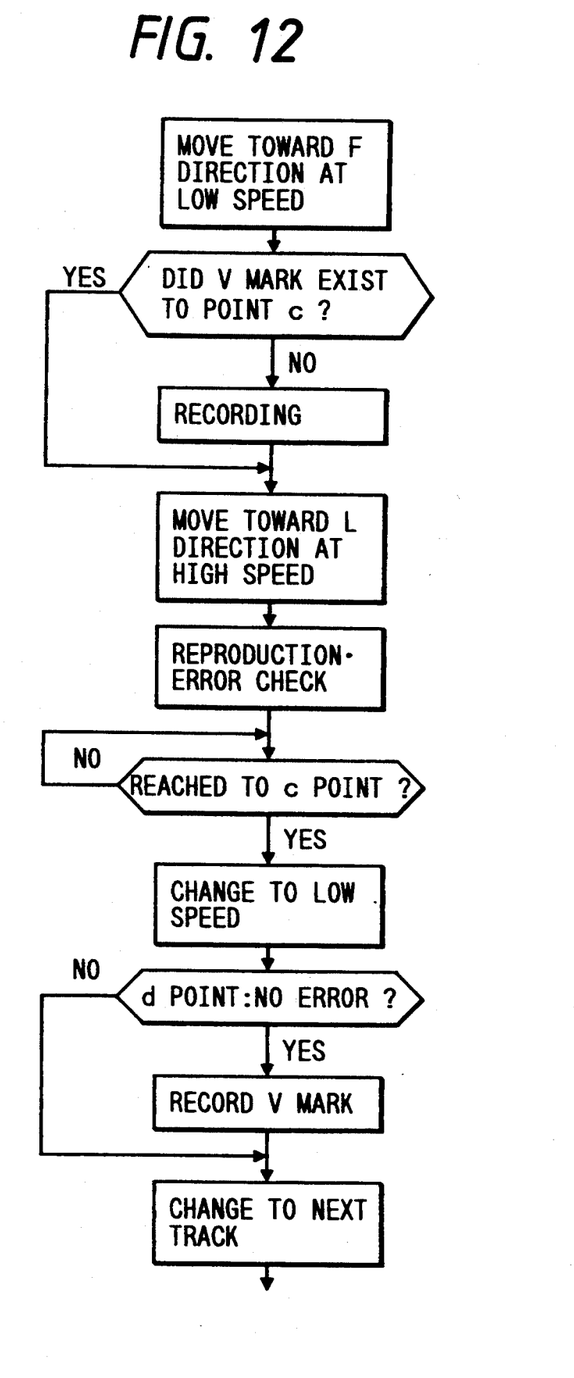
FIG. 12 is a flow chart for explaining the information recording operation.

In FIG. 10, the light beam spot S2 is moved along a moving path 35. FIG. 11A is a chart showing a change in moving velocity of the light beam spot S2 (i.e., the optical head 18) upon the above-mentioned movement, and FIG. 11B is a chart showing a recording timing upon movement. FIG. 12 is a flow chart for explaining the information recording operation.

Upon completion of the access to the target information track, the optical card 1 is moved in the L direction to shift the light beam spot S2 from a position a toward the F direction at a relatively low velocity on the optical card. In this case, if no V mark is detected until a position c, information is recorded on the information track 4-(m+1) between the position c and a position c';

if a V mark is detected until the position c, since the currently accessed track is the recorded information track without any error, no recording operation is performed. The light beam spot is reversed after it reaches a position b, and is moved toward the L direction at a relatively high velocity. In this case, the light amount of the light source is set to be a relatively low constant light amount at which recording cannot be performed, and information on the recorded information track 4-(m+1) is reproduced from the amount of light received by the photodetector 23, thus checking if the recorded content includes an error. This error check operation is performed until the light beam spot reaches the position c. After the light beam spot reaches the position c, the moving velocity is changed to a relatively low velocity like in the movement in the F direction. As a result of the error check operation, if it is determined that the recorded content does not include any error, the intensity of the light beam spot S2 is increased while the light beam spot is located between positions d and e on the extended line of the information track, thereby recording a V mark 34. Of course, the position of the V mark 34 is the same as the V mark 9 associated with the recorded information track. On the other hand, if it is determined as a result of the error check operation that the recorded content includes an error, no V mark is recorded.

When information recording is continuously performed, the kick operation is performed to move the light beam spot to the neighboring next track.

Figure 13A:
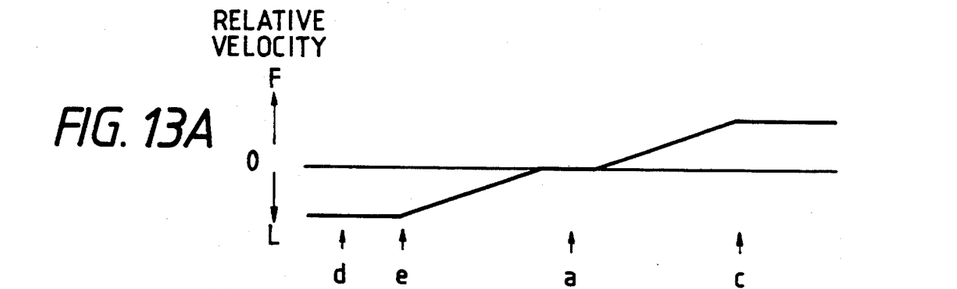
FIG. 13A is a chart showing a change in moving velocity of a light beam spot.
Figure 13B:
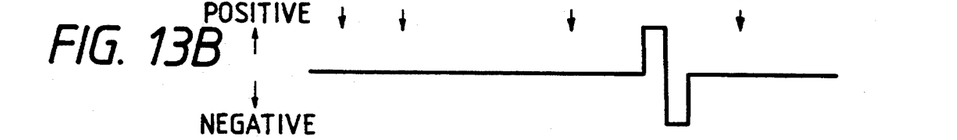
FIG. 13B is a chart showing a kick timing.

FIG. 13A is a chart showing a change in moving velocity of the light beam spot S2 (i.e., the optical head 18) before and after the kick operation, and corresponds to a portion K in FIG. 11A. FIG. 13B is a chart showing a kick operation timing.

After the light beam spot passes the position e in the L direction, the optical card 1 is decelerated, and the light beam spot is stopped at the position a.

In order to move the light beam spot in the F direction, the optical card 1 is then accelerated. During this acceleration range (a range detected as an acceleration range by the MPU 10), the MPU 10 issues a kick command to the kick circuit 71. The acceleration range is detected by the MPU 10 on the basis of the relative moving velocity between the optical card and the optical head in the R direction, which moving velocity, in turn, is detected by the moving velocity detection circuit 70. The kick circuit instructs the AT/AF control circuit 11 to open the AT control loop, and to output a predetermined positive kick pulse and a predetermined negative brake pulse shown in FIG. 13B to the AT actuator 16. Thus, the light beam spot is kicked, and is moved to the neighboring information track. After the brake pulse is applied, the kick circuit 71 instructs the AT/AF control circuit 11 to close the AT control loop.

As described above, after the light beam spot is moved to a new information track, recording is similarly performed. If the presence of an error is determined in the error check operation after recording on the information track before the movement of the light beam spot, the same information as that recorded in the immediately preceding recording operation is recorded on the new information track.

After the information is recorded on the information track, as described above, the logical track number of the information track subjected to recording and directory information indicating the content of the recorded information are additionally recorded on the directory track.

In the above description, the light beam spot is moved at different velocities in the recording mode and the error check mode, but may be moved at the same velocity in these modes.

When information is reproduced, an access to a target information track is made by a method similar to that in the recording mode.

Figure 14:
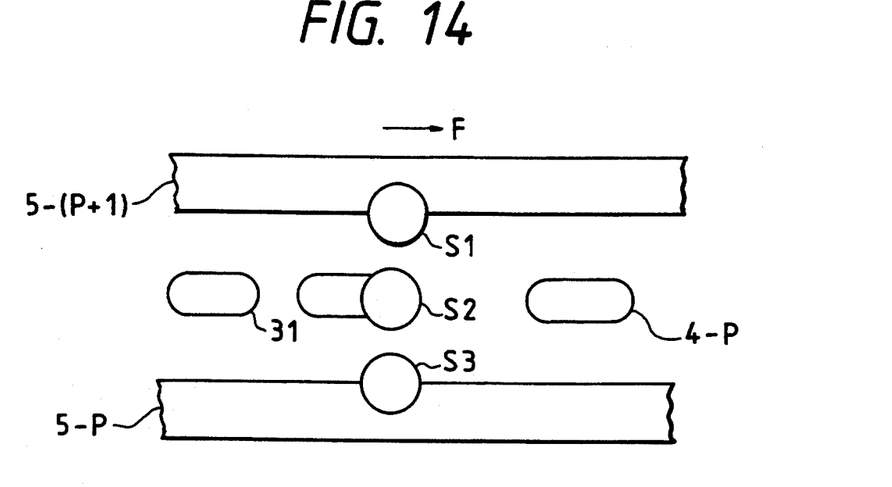
FIG. 14 is a view showing the relationship between the light beam spots and the tracks in a reproduction mode.

FIG. 14 shows the relationship between the light beam spots and the tracks in the reproduction mode. The light beam spots S3 and S1 are respectively located on the tracking tracks 5-p and 5-(p+1), and the light beam spot S2 is located on the recorded information track 4-p ($p \leq m$).

Reproduced data information is transferred from the MPU 10 to the CPU 50.

Figure 15:
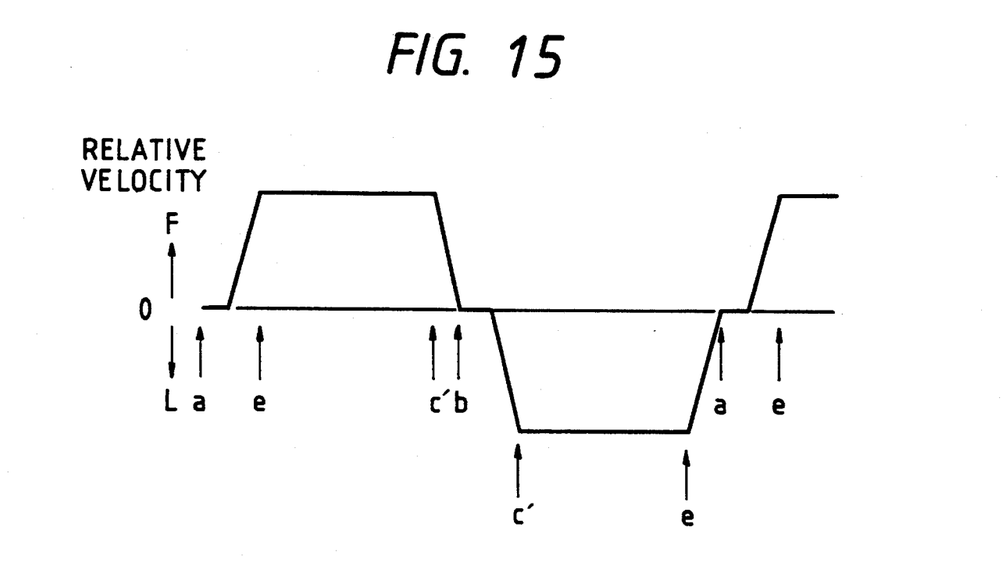
FIG. 15 is a chart showing a change in moving velocity of the light beam spot in the reproduction mode.

FIG. 15 is a chart showing a change in moving velocity of the light beam spot (i.e., the optical head) in the reproduction mode. In this case, the kick operation may be performed during either of an interval between positions a and e or an interval between positions b and c' in which the optical card is accelerated. More specifically, when the light beam spot is located at the position a at the beginning of reproduction, if a V mark is detected until the light beam spot reaches the position c, the kick operation is performed during the interval between the positions b and c' after the error check operation. On the other hand, if no V mark is detected until the light beam spot reaches the position c, the kick operation is performed during the interval between the positions b and c' without executing reproduction. On the other hand, when the light beam spot Is located at the position b at the beginning of reproduction, the operation is executed up to the error check operation. In this case, if no V mark is detected until the light beam spot reaches the position e, reproduced data is not accessed regardless of the presence/absence of an error, and the kick operation is performed during the interval between the positions a and e. However, if a V mark is detected until the light beam spot reaches the position e, and if the absence of an error is detected, reproduced data is accessed, and the kick operation is performed during the interval between the positions a and e. If the presence of an error is detected, the kick operation is performed during the interval between the positions a and e or between the positions b and c' after a predetermined number of times of retrials.

Note that the kick operation is performed in the same manner as in the recording mode.

In the above embodiment, the kick operation is performed during the acceleration range. However, the present invention is not limited to this. For example, the kick operation may be performed during a deceleration range, thus obtaining the same effect as described above.

In the above embodiment, the kick operation to the neighboring track is performed. However, the present invention is not limited to this. For example, in order to access the light beam spot to a desired track, the light beam spot may be kicked across a plurality of tracks, thus obtaining the same effect as described above.

In the above embodiment, the acceleration or deceleration range is detected by the MPU 10 according to the relative moving velocity between the light beam spot and the optical card, which is detected by the moving velocity detection circuit 70. Alternatively, an encoder for detecting a position, in the R direction, of the optical card may be arranged, and the MPU 10 may detect the acceleration or deceleration range on the basis of the output from the encoder. In this case, the acceleration or deceleration range can be detected on the basis of the position, in the R direction, of the optical card since, for example, the relative velocity profile shown in FIG. 11 is uniquely related to the relative position between the light beam spot and the optical card.

What is claimed is:

1. An optical information recording and/or reproducing method for recording and/or reproducing information by reciprocally moving a card-like optical information recording medium having a plurality of parallel information tracks and an optical head relative to each other in an information track direction, and irradiating the medium with a light spot from the optical head, said method comprising:

moving the optical head and the recording medium relative to each other in the information track direction;

effecting at least one of recording of information along the information track of the medium and reproducing recorded information along the information track using the light spot irradiated from the optical head onto the medium during the relative movement; and moving the light spot from a current track to a desired track, wherein the step of moving the light spot from a current track to a desired track is executed during a period in which the relative movement between the optical head and the recording medium in the information track direction is in one of an accelerated state and a decelerated state.

2. An optical information recording and/or reproducing method for recording and/or reproducing information by reciprocally moving a card-like optical information recording medium having a plurality of parallel information tracks and an optical head relative to each other in an information track direction, and irradiating the medium with a light spot from the optical head, said method comprising the steps of:

moving the optical head and the recording medium relative to each other in the information track direction;

effecting at least one of recording of information along the information track of the medium and reproducing recorded information along the information track using the light spot irradiated from the optical head onto the medium during the relative movement;

detecting whether a relative movement between the optical head and the recording medium in the information track direction is in one of an accelerated state and a decelerated state; and moving the light spot from a current track to a desired track when it is detected in said detecting step that the relative movement between the optical head and the recording medium in the information track direction is in one of an accelerated state and a decelerated state.

3. An optical information recording and/or reproducing apparatus for recording and/or reproducing information by reciprocally moving a card-like optical information recording medium having a plurality of parallel information tracks and an optical head relative to each other in an information track direction, and irradiating the medium with a light spot from the optical head, said apparatus comprising:

an optical head;

relative movement means for moving said optical head and the medium relative to each other along the information track; and light spot moving means for moving the light spot from a current track to a desired track when the relative movement between the optical head and the recording medium in the information track direction is caused to be in one of an accelerated state and a decelerated state by said relative movement means.

4. An apparatus according to claim 3, further comprising detection means for detecting whether the relative movement between said optical head and the recording medium in the information track direction is in one of an accelerated state and a decelerated state, wherein said light spot moving means moves the light spot from a current track to a desired track when said detection means detects that the relative movement between the optical head and the recording medium in the information track direction is in one of the accelerated state and the decelerated state.

* * * * *

UNITED STATES PATENT AND TRADEMARK OFFICE
CERTIFICATE OF CORRECTION

PATENT NO. : 5,436,438
DATED : July 25, 1995
INVENTOR(S) : SATOSHI SHIKICHI

It is certified that error appears in the above-indentified patent and that said Letters Patent is hereby corrected as shown below:

COLUMN 6:

Line 27, "Grating 30," should read --grating 30,--.
Line 30, "Grating." should read --grating.--.
Line 39, "10 light)" should read --light)--, and "card 1. The light" should read --card 1. ¶The light--.
Line 49, "24. FIG. 5" should read --24. ¶FIG. 5--.

COLUMN 7:

Line 52, "interval J" should read --interval j--.

COLUMN 10:

Line 33, "Is" should read --is--.

Signed and Sealed this

Twenty-first Day of November, 1995

Attest:

BRUCE LEHMAN

Attesting Officer

Commissioner of Patents and Trademarks